(12) United States Patent
Bjork

(10) Patent No.: US 6,550,420 B1
(45) Date of Patent: Apr. 22, 2003

(54) METHOD AND APPARATUS FOR CLEANING THE TEATS OF A DAIRY ANIMAL'S UDDER

(75) Inventor: Anders Gosta Axel Bjork, Tumba (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 09/763,858

(22) PCT Filed: Aug. 31, 1999

(86) PCT No.: PCT/SE99/01493
§ 371 (c)(1),
(2), (4) Date: Apr. 26, 2001

(87) PCT Pub. No.: WO00/11933
PCT Pub. Date: Mar. 9, 2000

(30) Foreign Application Priority Data

Aug. 31, 1998 (SE) ............................................... 9802922

(51) Int. Cl.⁷ .................................................. A01J 7/04
(52) U.S. Cl. ..................................... 119/14.47; 119/651
(58) Field of Search .............................. 119/14.47, 651, 119/14.18, 670, 665, 14.02; A01J 7/00, 7/04

(56) References Cited

U.S. PATENT DOCUMENTS

| 5,211,961 | A | * | 5/1993 | Adkinson ................... 424/616 |
| 5,474,023 | A | * | 12/1995 | Khodabandehloo et al. ..... 119/14.1 |
| 5,673,650 | A | * | 10/1997 | Mottram et al. ............ 119/651 |
| 5,678,506 | A | * | 10/1997 | van der Berg et al. ... 119/14.18 |
| 5,704,311 | A | | 1/1998 | van den Berg .......... 119/14.02 |
| 5,862,776 | A | * | 1/1999 | van den Berg ............ 119/14.1 |
| 5,919,471 | A | * | 7/1999 | Saferstein et al. .......... 424/402 |
| 6,231,688 | B1 | * | 5/2001 | Ericksson .................... 148/259 |
| 6,234,110 | B1 | * | 5/2001 | Xavier ..................... 119/14.18 |
| 6,235,021 | B1 | * | 12/2001 | Farina ........................ 119/612 |

FOREIGN PATENT DOCUMENTS

| EP | 399132 A1 | * | 11/1990 | ............. A01J/7/00 |
| EP | 535755 A1 | * | 10/1991 | ............. A01J/7/00 |
| EP | 0 476 771 | | 3/1992 | |
| EP | 0 534 564 | | 3/1993 | |
| FR | 2 559 351 | | 8/1985 | |
| GB | 2 272 626 | | 5/1994 | |
| SU | 1197-614 A | | 12/1985 | |

* cited by examiner

Primary Examiner—Charles T. Jordan
Assistant Examiner—John W. Zerr
(74) Attorney, Agent, or Firm—Young & Thompson

(57) ABSTRACT

The invention relates to a method and an apparatus for minimizing or even avoiding the transfer of an infection from an infected teat/quarter udder to a healthy teat. The invented method for cleaning the teats (9) of a dairy animal's udder is controlled by a robot means (6) for carrying and operating a cleaning means (8, 14) to clean said teats (9) in succession. This is accomplished by first cleaning one or more healthy teat(s), and then cleaning one or more teat(s) being subjected to various levels of infection. The invented apparatus for cleaning the teats of a dairy animal's udder comprises a control unit (1), a cleaning means (8, 14), a robot means (6) controlled by the control unit (1), a robot arm (7) arranged on the robot means (6) to carry and operate the cleaning means (8, 14) so as to clean the dairy animal's teats in succession.

11 Claims, 3 Drawing Sheets

METHOD AND APPARATUS FOR CLEANING THE TEATS OF A DAIRY ANIMAL'S UDDER

TECHNICAL FIELD OF THE INVENTION

Figure 1:
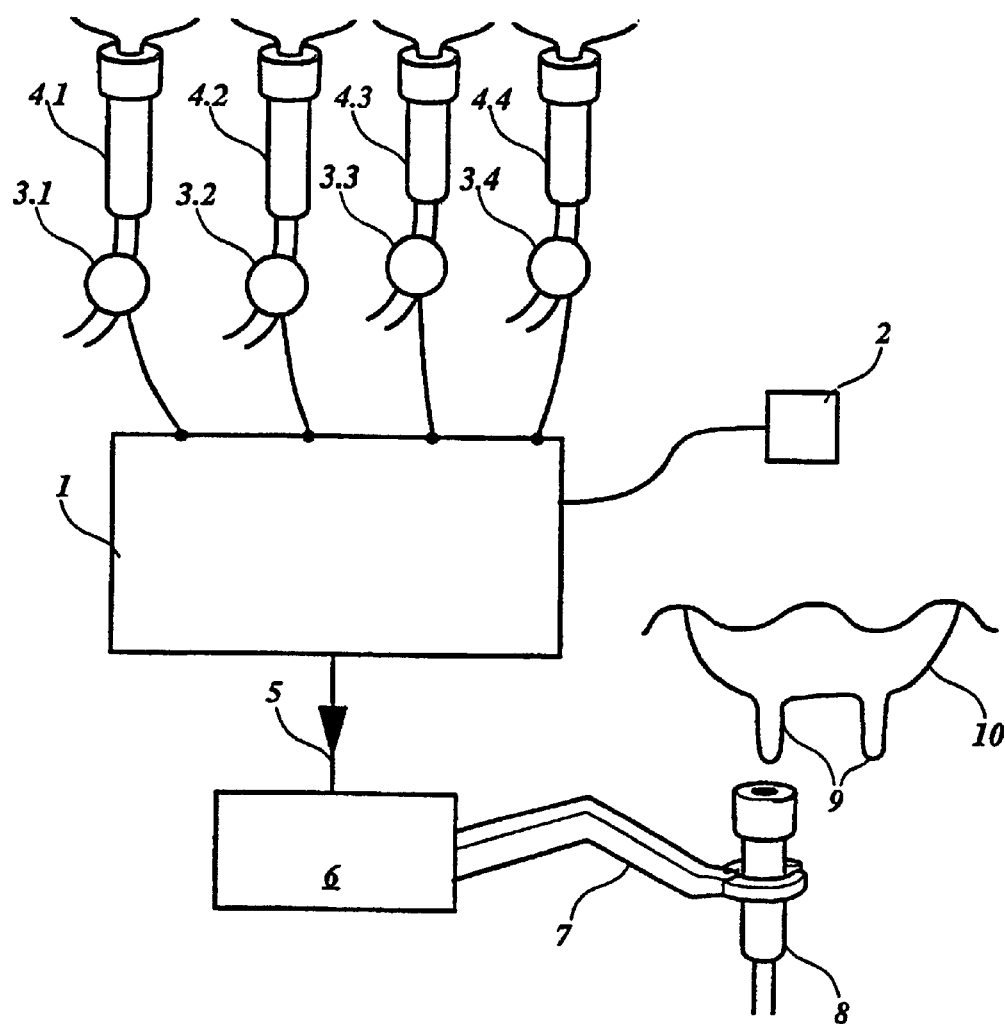

The invention relates to a method for cleaning teats of a dairy animal's udder by controlling a robot means to carry and operate a cleaning means for cleaning said teats in succession.

The invention also relates to an apparatus for cleaning the teats of a dairy animal's udder, comprising a cleaning means, a control unit, a robot means controlled by the control unit, a robot arm arranged on the robot means to carry and operate the cleaning means so as to clean the dairy animal's teats in succession.

BACKGROUND OF THE INVENTION

Such a method and such an apparatus are known from EP-A-0476 771.

Always when cleaning the teats it is of very great importance that hygienic aspects are taken into consideration. In the art, methods are generally based on precautions to be taken such that no infection is transferred from one animal to another.

OBJECT OF THE INVENTION

The object of the present invention is to improve known methods and apparatus regarding the hygienic aspects. The invention has for its object to achieve an apparatus for carrying out the invented method.

SUMMARY OF THE INVENTION

This object is achieved by a method which is characterised by the steps of first cleaning one or more healthy teat(s), and then cleaning one or more teat(s) being subjected to various levels of infection.

The object has also been achieved by an apparatus which is characterised in that the control unit comprises a data storing means intended to store data regarding the healthiness of an udder quarter belonging to a teat, and a data processing unit adopted to use said data for delivering such signals to the robot means as to make the robot means first to clean one or more healthy teat(s) and then to clean one or more teat(s) indicated to be subject to various levels of infection.

In this way infection is not transferred from infected teats to healthy teats.

An embodiment of the invention includes establishing the degree of healthiness of each separate teat with reference to the level of infection. Hereby, data are obtained making it possible to arrange the teats in order of increasing level of infection.

Another embodiment of the invention anticipates that said establishment is achieved by detecting the conductivity of milk extracted at a previous milking session. Hereby, a very simple and reliable method of determining the level of infection is achieved.

Yet another embodiment comprises the step of storing data regarding the degree of healthiness of each separate teat, and using said data for determining said order of succession. Hereby, a controlled cleaning of the teats is achieved.

An alternative embodiment comprises the step of cleaning infected teats in order of increasing level of infection. Hereby, the infection level of a specific teat is not increased by being further infected from a teat having a higher level of infection.

A preferred embodiment comprises the step of cleaning said teat by means of a cleaning liquid acting as a rinsing agent. Hereby, a very gentle cleaning of the teat is realised.

Another preferred embodiment comprises the step of cleaning said teat by means of cleaning means having counter rotatable rubbing elements such as sponges, brushes or the like. Using such a device means an efficient mechanical cleaning of the teat.

Another embodiment of the invented apparatus comprises a data storing means intended to store data regarding the healthiness of an udder quarter belonging to a teat, and a data processing unit adopted to use said data for delivering such signals to the robot means as to make the robot means first to clean one or more healthy teat(s) and then to clean one or more teat(s) indicated to be subject to various levels of infection. Hereby, the risks for spreading is still more subdued.

Still another embodiment comprises sensors or detectors connected to said control means and adapted to establish the degree of healthiness of each separate teat. Preferably, the inventive apparatus comprises a conductivity measuring device for establishing the level of infection of each separate teat during a previous milking session. Hereby, data for operation of the apparatus is achieved in a very time efficient and safe way.

Another preferred embodiment anticipates that the control unit is arranged to send such signals to the robot means as to cause the robot means to clean infected teats in order of increasing level of infection. Hereby, the robot means, in the first place the robot arm, is controlled in an adequate way,

DRAWING SUMMARY

Figure 2:
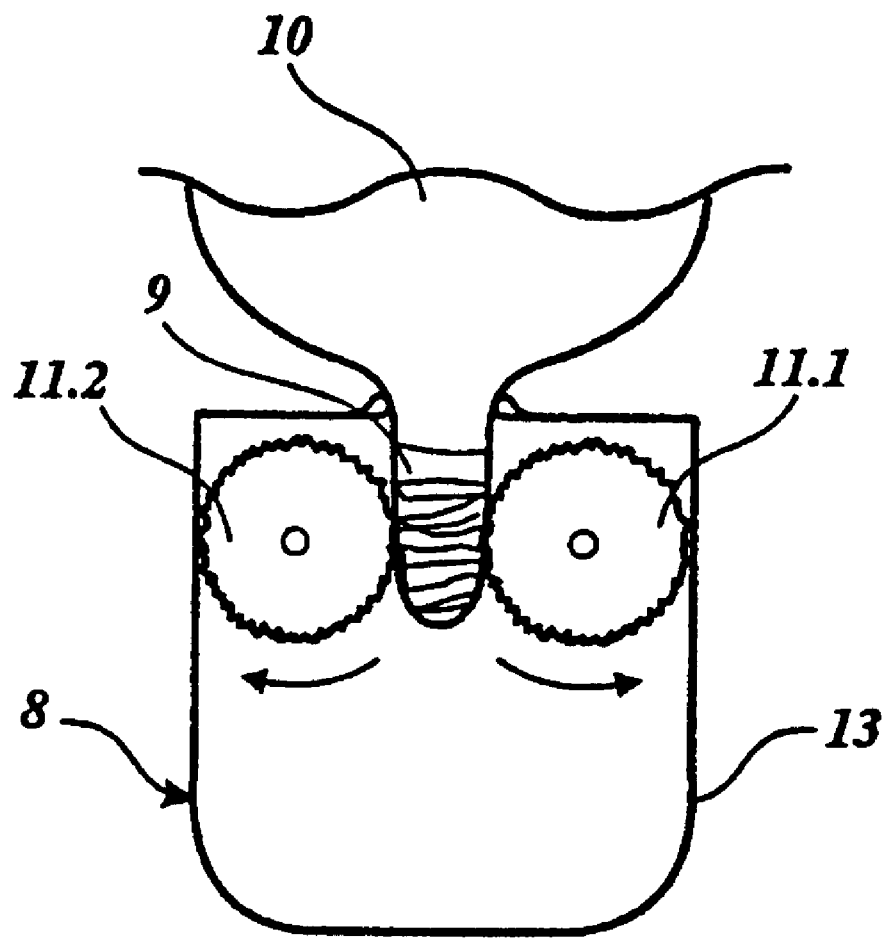
Figure 3:
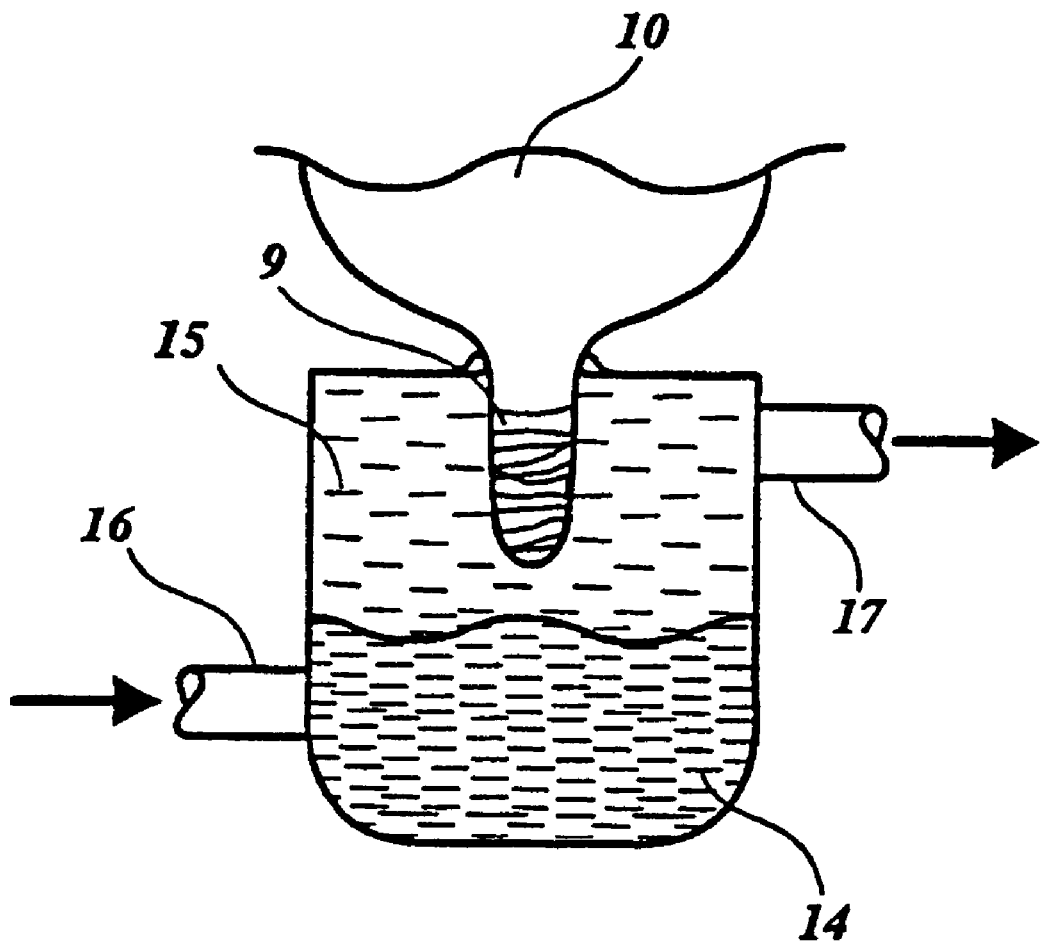

For a better understanding of the invention, exemplifying embodiments will now be described with reference being made to the accompanying drawings in which FIG. 1 schematically indicates a flow chart and main units and means for carrying out the invention, FIG. 2 is a view of a cleaning cup with mechanical, rotatable cleaning elements, and FIG. 3 is an elevation view, partly in section, of a teat cleaning cup of a rinse type.

DETAILED DESCRIPTION

FIG. 1 schematically shows the main units and means of the invention. The control unit 1 comprises a CPU (Central Processing Unit) for calculation and preparation of data and output signals according to adequate programs or algorithms, data storing means for receiving and storing input signals from animal identification means 2 and detectors 3.1–3.4 as well as output means for sending operational signals to the robot means 6. The operation and function of the various units comprised in the control unit are not shown or described here as they are well known in the art.

The animal identification means 2 may be a transponder arranged on e.g. a cow and a transponder reader at a stall. By 3.1–3.4 are indicated significant detecting means, attached in the milk tube from each individual milking cup 4.1–4.4 used to establish the grade of healthiness or level of infection of the animal's disparate quarter udders and corresponding teats by detecting the milk extracted from an udder quarter. The detectors 3.1–3.4 may be conductivity detectors for establishing mastitis and this can be made at any previous milking session, preferably at predetermined time intervals. Alternatively, the detectors 3.1–3.4 may be milk meters.

Outgoing from the data received from the identification means 2 and detectors 3.1–3.4 the control unit 1 delivers output signals 5 to the robot means 6, controlling the operation of the robot means. These operations include e.g. the movements of the robot arm 7 carrying the cleaning cup 8 to place same in working position at the teat 9 of an udder 10 of the animal, to start and stop possible mechanical cleaning elements, such as sponges, brushes or the like as well as a flow of liquid through the cleaning cup.

According to the invention the output signals 5 from the control unit 1 are such that the robot means 6 is caused to attach the cleaning cup 8 to the respective teats 9 in such a way that cleaning starts with one or more healthy teats and then proceeds to not healthy or infected teats in order not to transfer infection to the healthy teat(s).

To further promote the hygiene of the teats and still further prevent transferring infections from infected teas to teats having a lower degree of infection, the control signals 5 to the robot means 6 are such that the teats 9 are cleaned in order of increasing level of infection.

It should be noted that the invention only implies preventing transfer of infection from one teat to another teat, not reducing the presence of infection nor curing the infection.

FIG. 2 shows a cleaning cup 8 with mechanical cleaning elements 11.1 and 11.2 for cleaning the teat 9 of an udder 10. The cleaning elements are formed by elongated, substantially circular cylindrical brushes or sponges, rotatable in opposite directions 12.1 and 12.2 respectively. The cleaning elements are supported in a housing 13 attachable to the teat 9 by operation of the robot arm 7.

FIG. 3 shows a cleaning cup 14 being adapted to be sealingly attached to the teat 9 of the udder 10 and filled with a cleaning liquid 15. The cleaning liquid 15 enters the cleaning cup 14 through an inlet 16 and exits through an outlet 17. The circulation of the cleaning liquid is such that the fresh liquid enters at the bottom of the cup 14 to enter close to the end of the teat 9, follows the teat 9 upwards towards the udder 10 and after cleaning exits through the outlet 17 or vice versa. It may be noted that the inlet 16 can be arranged tangentially to produce a swirl around the teat 9 to increase the cleaning efficiency.

What is claimed is:

1. A method for cleaning teats of a dairy animal's udder by controlling a robot to clean the teats in succession, the method comprising the steps of:

storing data regarding a degree of healthiness of each separate teat;

using the data to determine an order of succession of cleaning;

first cleaning one or more healthy teats, and then cleaning one more teats subjected to various levels of infection.

2. A method as claimed in claim 1, comprising the step of establishing the degree of healthiness of each separate teat with reference to the level of infection.

3. A method as claimed in claim 2, whereby said establishment is achieved by detecting the conductivity of milk extracted at a previous milking session.

4. A method as claim 1, comprising the step of cleaning infected teats in order of increasing level of infection.

5. A method as claimed in claim 1, comprising the step of cleaning said teat by means of a cleaning liquid acting as a rinsing agent.

6. A method as claimed in claim 1, comprising the step of cleaning said teat with counter rotatable rubbing elements.

7. An apparatus for cleaning the teats of a dairy animal's udder, comprising:

a cleaning means;

a control unit;

a robot means controlled by the control unit;

a robot arm arranged on the robot means to carry and operate the cleaning means so as to clean the dairy animal's teats in succession;

the control unit comprising, a data storing means for storing data regarding the healthiness of an udder quarter belonging to a teat, and a data processing unit adapted to use said data for delivering such signals to the robot means as to make the robot means to first clean one or more healthy teats and then to clean one or more teats indicated to be subject to various levels of infection; and sensors connected to said control unit and adapted to establish the degree of healthiness of each separate teat.

8. The apparatus as claimed in claim 7, further comprising a conductivity measuring device for establishing the level of infection of each separate teat during a previous milking session.

9. The apparatus as claimed in claim 7, wherein the control unit is arranged to send such signals to the robot means as to cause the robot means to clean infected teats in order of increasing level of infection.

10. The apparatus as claimed in claim 7, wherein said cleaning means comprises a cup with an inlet and an outlet for a cleaning liquid intended to act as a rinsing agent for cleaning the teat.

11. The apparatus as claimed in claim 7, wherein said cleaning means is provided with counter rotatable rubbing elements.

* * * * *